United States Patent
Coffin et al.

(10) Patent No.: US 11,520,687 B2
(45) Date of Patent: Dec. 6, 2022

(54) SYSTEM AND METHOD FOR AUTOMATED TESTING OF AN ACCESSIBILITY FEATURE OF A USER DEVICE BY EMULATING ACTIONS OF USERS

(71) Applicant: Bank of America Corporation, Charlotte, NC (US)

(72) Inventors: Robert Christopher Coffin, Matthews, NC (US); Srinivasa Chakravarthy Kotcherlakota, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 238 days.

(21) Appl. No.: 16/953,618

(22) Filed: Nov. 20, 2020

(65) Prior Publication Data
US 2022/0164278 A1 May 26, 2022

(51) Int. Cl.
| G06F 11/36 | (2006.01) |
| G10L 15/22 | (2006.01) |
| G10L 15/08 | (2006.01) |
| G10L 15/04 | (2013.01) |
| G06F 3/04883 | (2022.01) |

(52) U.S. Cl.
CPC .......... *G06F 11/3688* (2013.01); *G10L 15/04* (2013.01); *G10L 15/08* (2013.01); *G10L 15/22* (2013.01); *G06F 3/04883* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 6,889,337 | B1 | 5/2005 | Yee |
| 7,039,522 | B2 | 5/2006 | Landau |
| 7,121,470 | B2 | 10/2006 | McCall et al. |
| 7,194,411 | B2* | 3/2007 | Slotznick ................. G09B 5/06 704/270.1 |
| 7,434,167 | B2 | 10/2008 | Sinclair et al. |
| 7,448,023 | B2* | 11/2008 | Chory .................. G06F 16/958 717/124 |

(Continued)

OTHER PUBLICATIONS

Paresh Deshmukh et al., "Machine Learning Webpage Accessibility Testing Tool," U.S. Appl. No. 16/796,182, filed Feb. 20, 2020, 30 pages.

*Primary Examiner* — Isaac Tuku Tecklu

(57) ABSTRACT

A system for automating testing of an accessibility screen-reader for a software application includes an accessibility testing module. The accessibility testing module communicates a set of input commands to a user device in which the software application is installed. The set of input commands emulates a set of actions being performed on the software application. For each input command, an audio of a string of utterances is received when the accessibility screen-reader produces the audio. The audio is converted to a text of the string of utterances. The text is compared with a corresponding test string that is expected to be uttered by the accessibility screen-reader when a corresponding action is performed on the software application. If it is determined that the text matches the corresponding test string, it is concluded that the accessibility screen-reader uttered the corresponding test string that was expected to be uttered.

20 Claims, 3 Drawing Sheets

(56) References Cited

U.S. PATENT DOCUMENTS

| | | |
|---|---|---|
| 7,554,522 B2 | 6/2009 | Sinclair, II et al. |
| 7,606,915 B1 | 10/2009 | Clainov et al. |
| 7,624,277 B1 | 11/2009 | Simard et al. |
| 7,627,821 B2 * | 12/2009 | Klementiev ........ G06F 9/45512 715/704 |
| 7,644,367 B2 | 1/2010 | McKeon et al. |
| 7,653,896 B2 | 1/2010 | Herdeg, III |
| 7,657,844 B2 | 2/2010 | Gibson et al. |
| 7,685,260 B2 | 3/2010 | Fukuda et al. |
| 7,689,658 B2 | 3/2010 | Codignotto |
| 7,861,163 B2 | 12/2010 | Walker |
| 7,882,441 B2 | 2/2011 | Alderson |
| 7,966,184 B2 | 6/2011 | O'Conor et al. |
| 8,126,878 B2 | 2/2012 | Krasnow |
| 8,196,104 B2 | 6/2012 | Cohrs et al. |
| 8,245,277 B2 | 8/2012 | Lazar et al. |
| 8,448,142 B2 | 5/2013 | Squillace |
| 8,572,549 B2 | 10/2013 | Ganesh et al. |
| 8,655,789 B2 | 2/2014 | Bishop et al. |
| 8,667,468 B2 | 3/2014 | Breeds et al. |
| 8,671,142 B2 | 3/2014 | Shuster et al. |
| 8,751,971 B2 | 6/2014 | Fleizach |
| 8,903,326 B2 | 12/2014 | Gregg et al. |
| 8,904,279 B1 | 12/2014 | Bougon |
| 8,972,299 B2 | 3/2015 | Kelley |
| 9,082,239 B2 | 7/2015 | Ricci |
| 9,275,167 B2 | 3/2016 | Melnyk et al. |
| 9,489,131 B2 | 11/2016 | Seymour et al. |
| 9,532,737 B2 | 1/2017 | Karan et al. |
| 9,760,236 B2 | 9/2017 | Sivakumar et al. |
| 9,824,473 B2 | 11/2017 | Winternitz et al. |
| 9,922,004 B2 | 3/2018 | Gluck et al. |
| 10,001,900 B2 | 6/2018 | Gallo et al. |
| 10,013,162 B2 | 7/2018 | Fleizach et al. |
| 10,466,883 B2 * | 11/2019 | Fleizach ................. G06F 3/167 |
| 10,616,294 B2 | 4/2020 | Shribman et al. |
| 2006/0128373 A1 | 6/2006 | Cochrane et al. |
| 2010/0205523 A1 | 8/2010 | Lehota et al. |
| 2011/0150249 A1 | 6/2011 | Klemmensen |
| 2013/0158934 A1 | 6/2013 | Lee et al. |
| 2013/0311485 A1 | 11/2013 | Khan |
| 2015/0089399 A1 | 3/2015 | Megill et al. |
| 2016/0357354 A1 | 12/2016 | Chen et al. |
| 2017/0075701 A1 | 3/2017 | Ricci et al. |
| 2018/0039973 A1 | 2/2018 | Bishop et al. |
| 2019/0183393 A1 | 6/2019 | Taub et al. |
| 2020/0012627 A1 * | 1/2020 | Kim ....................... G10L 25/51 |
| 2020/0371754 A1 * | 11/2020 | P K ........................ G06F 40/56 |

* cited by examiner

SYSTEM AND METHOD FOR AUTOMATED TESTING OF AN ACCESSIBILITY FEATURE OF A USER DEVICE BY EMULATING ACTIONS OF USERS

TECHNICAL FIELD

The present disclosure relates generally to software developments, testing, and emulations, and more specifically to a system and method for automated testing of an accessibility feature of a user device by emulating actions of users.

BACKGROUND

It is challenging for users with disabilities to navigate software, web, or mobile applications. Current application development technologies are not configured to provide people with disabilities easily accessible and navigable applications to perform their daily tasks.

SUMMARY

Current application development technologies may not be configured to provide applications that are operable or compatible with the accessibility feature of a user device. This disclosure contemplates systems and methods for conducting automated testing of an accessibility feature of a software, mobile, or web application to determine whether the application is operable or compatible with the accessibility feature of a user device. In other words, the disclosed systems determine whether the software application is accessibility-compliant. In an accessibility-compliant application, users can easily navigate through the application to perform their intended tasks. An exemplary software, mobile, or web application may include elements that are used to navigate through the application. The elements of the application may include buttons, icons, hyperlinks, text fields, among others. Users can navigate through the application by, for example, selecting elements of and changing pages of the application. In this disclosure, a software, mobile and web application may be used interchangeably to note the capability of the disclosed systems to operate on various platforms and technologies.

Users with disabilities, such as users with visual disabilities may use an accessibility feature of their user device to navigate the software application. The accessibility feature or accessibility screen-reader is configured to utter or speak a particular description of an element of a software application when that element is selected or activated. The accessibility screen-reader may also utter navigating gestures when a user performs those navigating gestures, such as sliding right, sliding left, scrolling up, scrolling down, etc.

The disclosed systems conduct automated testing of the accessibility screen-reader for a software application such that every action that a user would perform in navigating through the software application is emulated. As such, the accessibility screen-reader can be tested to determine whether it utters a particular description of each element of the software application that is expected to be uttered.

In one embodiment, a system for automating testing of an accessibility screen-reader for a software application comprises an accessibility testing module. The accessibility testing module is communicatively coupled with a user device. The accessibility testing module includes a memory and a first processor.

The memory is operable to store a set of test strings that is expected to be uttered by an accessibility screen-reader when a corresponding set of actions is performed on a software application on the user device. The set of actions comprises at least one of selecting an item, filling out a text field, and performing a navigating gesture on the software application. The memory is further operable to store a set of input commands that emulates the set of actions on the software application. The set of input commands corresponds to the set of test strings.

The first processor is operably coupled with the memory. The first processor is configured to automatically communicate the set of input commands to the user device in a particular order. For each input command from the set of input commands, the first processor receives audio of a string of utterances when the accessibility screen-reader produces the audio. The string of utterances corresponds to a particular action being performed on the software application. The first processor converts the audio to a text comprising the string of utterances. The first processor compares the text with a corresponding test string from the set of test strings. The first processor determines whether the text matches the corresponding test string. In response to determining that the text matches the corresponding test string, the first processor determines that the accessibility screen-reader uttered the corresponding test string that was expected to be uttered.

The disclosed systems provide several practical applications and technical advantages which include: 1) technology that utilizes an accessibility testing module that is configured to produce and communicate input commands to a user device in which the accessibility screen-reader for the software application is being tested; 2) technology that utilizes an interface module between the accessibility testing module and the user device, where the interface module is configured to act as both i) an input device, such as a keyboard, a touchscreen, a mouse, etc., and ii) an audio capturing device, such as a headset, a voice recorder, etc.; 3) technology that emulates actions of a user navigating the software application; and 4) technology that captures an audio produced or uttered by the accessibility screen-reader, converting that to text, comparing the text with a test string, and determining whether they match, thus, determining whether the accessibility screen-reader uttered the test string that is expected to be uttered when a particular action was performed on the software application.

As such, the systems described in this disclosure may improve the software application development technologies by conducting the automated testing of the accessibility feature for the software application, thus determining whether the software application can be easily navigated by uses. For example, the disclosed systems determine whether there are any inconsistences in the elements of the software application such that when an element is activated, the accessibility screen-reader does not utter or speak what is expected. In other words, the disclosed systems determine whether the software application is accessibility-compliant. Accordingly, if it is determined that the software application is not accessibility-compliant, it may go through a revision to ensure that the accessibility screen-reader utters a particular description of each element that is expected to be uttered when each element is activated.

Furthermore, the disclosed systems may improve the operation of the underlying software application development technologies. As an example, by using the disclosed systems, developers can test the compatibility and operability of a software application with the accessibility screen-reader of user devices with various platforms and operation systems in an automated process. As another example, the developers can test every scenario that a user would perform in navigating the software application across various platforms and operation systems of user devices in an automated process. As such, the disclosed systems provide an additional practical application of reducing processing time, power, and memory that would otherwise be spent in developing, troubleshooting, and revising the software application using the current development technologies. This, in turn, provides an additional practical application of reducing troubleshooting complexity in the development of the software applications.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
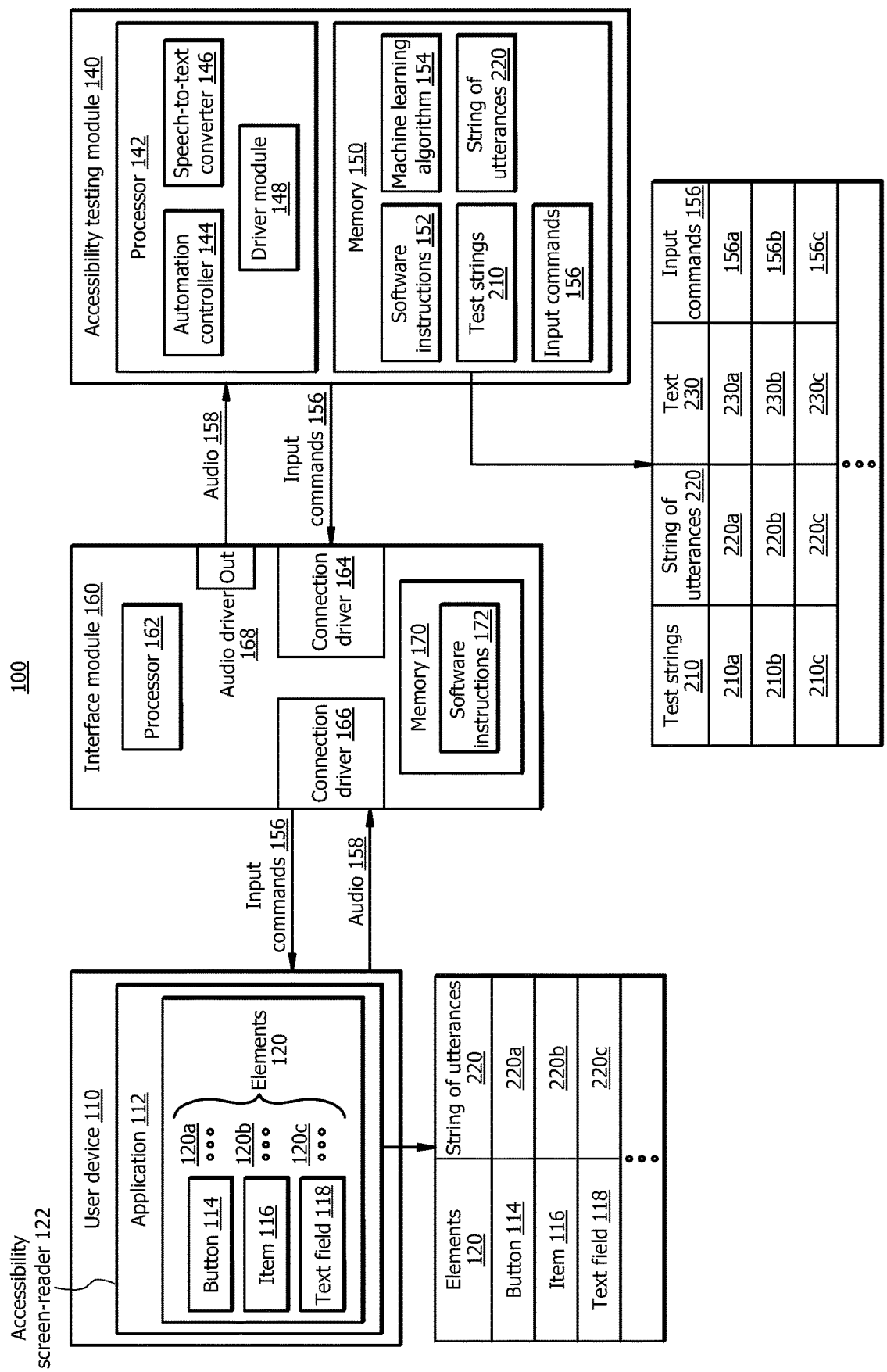
FIG. 1 illustrates one embodiment of a system configured to conduct automated testing of an accessibility screen-reader for a software application.

FIG. 1 illustrates one embodiment of a system 100 configured to conduct automated testing of an accessibility screen-reader 122 for an application 112 on a user device 110. In one embodiment, system 100 comprises an accessibility testing module 140 and an interface module 160. The accessibility testing module 140 comprises a processor 142 in signal communication with a memory 150. Memory 150 comprises software instructions 152 that when executed by the processor 142 cause the accessibility testing module 140 to perform one or more functions described herein. The accessibility testing module 140 is generally configured to communicate input commands 156 to the user device 110 (via the interface module 160) in order to test the accessibility screen-reader 122 for an application 112 on the user device 110. In other embodiments, system 100 may not have all of the components listed and/or may have other elements instead of, or in addition to, those listed above.

In general, system 100 forwards a set of input commands 156 to the user device 110 (from the accessibility testing module 140) through the interface module 160, where the set of input commands 156 are a set of emulations of particular actions of a user on the application 112, such as pressing a button 114, selecting an item 116, selecting a text field 118, etc. The set of input command 156 corresponds to a set of test strings 210 that are expected to be uttered by the accessibility screen-reader 122 when a corresponding particular action is being performed on the application 112. For example, when the button 114 is pressed or selected, it is expected that the accessibility screen-reader 122 to utter the description of the button 114. The description of the button 114 includes the name and content of the button 114. For determining whether when the button 114 is pressed or selected, the accessibility screen-reader 122 utters what is expected, a set of test strings 210 that matches the description of the button 114 is provided to the system 100.

When an input command 156 is executed on the application 112, the accessibility screen-reader 122 speaks or utters a set of string of utterances 220 that corresponds to the particular action being performed on the application 112. The system 100 receives an audio 158 of the string of utterances 220 at the accessibility testing module 140 (through the interface module 160). The system 100 converts the audio 158 to text 230. The system 100 compares the text 230 with the corresponding test string 210. If it is determined that the text 230 matches the corresponding test string 210, system 100 determines that the accessibility screen-reader 122 uttered the corresponding test string 210 (or the string of utterances 220) that was expected to be uttered.

User Device

User device 110 is generally any computing device that is capable of communicating data with other computing devices. Examples of the user device 110 include, but are not limited to, a mobile phone, a tablet, a laptop, a desktop computer, a handheld computing device, and the like. The user device 110 is capable of interacting with users, e.g., from user interfaces, such as a touchscreen, buttons, a keyboard, a mouse, etc. For example, a user can access an application 112 from the user device 110 using user interfaces of the user device 110.

Application 112 is generally any software/mobile/web application 112 that is designed or configured to interact with users. The application 112, for example, may be associated with an organization that provides products and/or services to its clients or users. The application 112 may be designed or developed to include elements 120 to interact with users. In the illustrated example, the elements 120 include at least one button 114, at least one item 116, and at least one text field 118. In other examples, application 112 may include any combination of interfacing elements 120. For instance, elements 120 may include images and videos. As such, when an image or a video is selected, the accessibility screen-reader utters the description of that image or video.

To navigate the application 112, the user may, for example, press on/click on/select buttons 114 and items 116 displayed on a foreground of the application 112. In another example, the user may write in the text field 118. For instance, the user may write their username and password in text fields 118. As another instance, the user may compose a letter in the text field 118, for example as the content of an email. In another example, the user may use gestures to navigate the application 112, such as scrolling up/down, sliding left/right, selecting an item, among other gestures.

During the development of the application 112, each of the elements 120 of the application 112 is attributed or labeled with an accessibility property. The aim to attribute accessibility properties to the elements 120 is to make the application 112 more accessible to users. In particular, the accessibility properties are attributed to the elements 120 to make the application 112 more accessible to users with disabilities, such as visual disabilities.

Figure 2:
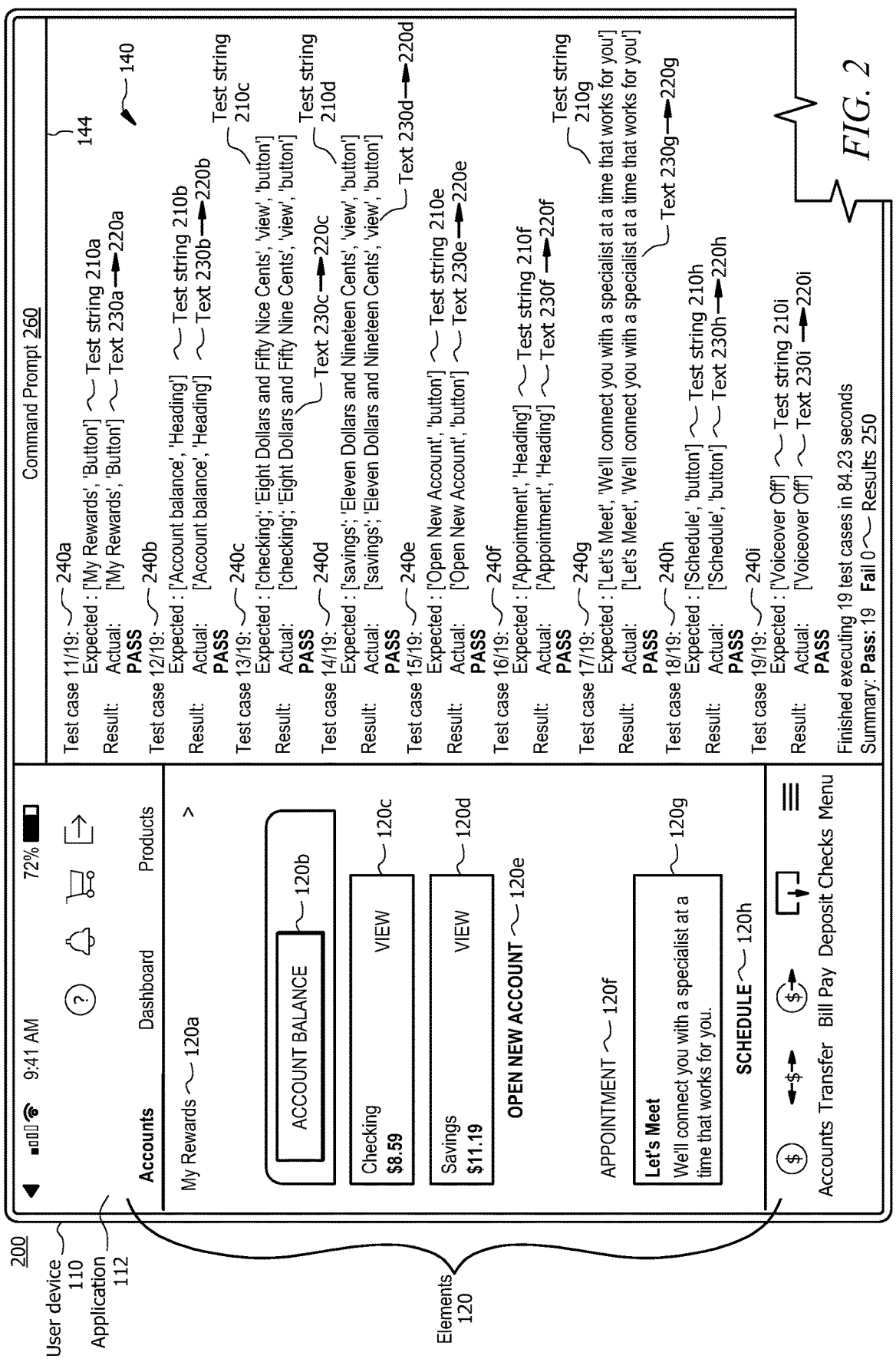
FIG. 2 illustrates an example screenshot of an automated testing process of an accessibility screen-reader performed by the system of FIG. 1.

The accessibility property attributed to an element 120 may include a string of utterances 220 that is uttered by the accessibility screen-reader 122 when that element 120 is activated or selected or a navigating gesture is detected. In the illustrated example, exemplary elements 120a to 120c (i.e., button 114, item 116, and text field 118) with their corresponding strings of utterances 220a to 220c are listed. For example, button 114 is attributed with a first string of utterances 220a, item 116 is attributed with a second string of utterances 220b, and text field 118 is attributed with a third string of utterances 220c. More examples of the strings of utterances 220 with their corresponding elements 120 are illustrated in FIG. 2, which is described in detail further below.

Accessibility Testing Module

Accessibility testing module 140 may generally include any computing device that is configured to process data and interact with other computing devices. In one embodiment, the accessibility testing module 140 may include a Printed Circuit Board (PCB) that includes components described herein. The accessibility testing module 140 may include a processor 142 that is in signal communication with a memory 150. Memory 150 is operable to store software instructions 152 that when executed by the processor 142 cause the accessibility testing module 140 to perform one or more functions described herein. The accessibility testing module 140 may be configured as shown or any other configuration.

Processor 142 comprises one or more processors operably coupled to the memory 150. The processor 142 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 152) to implement the automation controller 144, speech-to-text converter 146, and driver module 148. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 130 is operable to store the software instructions 152, machine learning algorithms 154, test strings 210, string of utterances 220, text 230, input commands 156, and/or any other data or instructions. The software instructions 152 may comprise any suitable set of instructions, logic, rules, or code operable to execute the processor 142.

Automation Controller

Automation controller 144 may be implemented by the processor 142 executing software instructions 152, and is configured to initiate automated testing of the accessibility screen-reader 122 and evaluate whether the accessibility screen-reader 122 speaks or utters a set of a string of utterances 220 that is expected to be uttered when a particular action is performed on a corresponding element 120. The result of the testing process of the accessibility screen-reader 122 may also indicate whether each of the elements 120 is attributed or labeled with a correct string of utterances 220.

To initiate the automated testing process of the accessibility screen-reader 122 for the application 112, the automation controller 144 takes an input test file comprising a set of test strings 210 that is expected to be uttered by the accessibility screen-reader 122 when a corresponding action is performed a particular element 120 on the application 112. The corresponding action being performed on the particular element 120 may include selecting an element 120, performing a navigating gesture, among others, similar to that described above. An exemplary input test file comprising a plurality of test strings 210 with its corresponding elements 120 is illustrated in TABLE 1.

TABLE 1

Examples of test strings 210 for elements 120

| Elements 120 | Test strings 210 | |
|---|---|---|
| 120a | My Rewards, Button | 210a |
| 120b | Account balance, Heading | 210b |
| 120c | Checking, eight dollars and fifty nine cents, View, Button | 210c |
| 120d | Savings, eleven dollars and nineteen cents, View, Button | 210d |
| 120e | Open new account, Button | 210e |
| 120f | Appointment, Heading | 210f |
| 120g | Let's meet, we'll connect you with a specialist at a time that works for you | 210g |
| 120h | Schedule, Button | 210h |
| 120i | Voiceover off | 210i |

As illustrated in TABLE. 1, each of elements 120a to 120i is attributed or labeled with a corresponding test string 210a to 210i that is expected to be uttered by the accessibility screen-reader 122 when each element 120 is selected.

Referring to FIG. 2, the elements 120 are illustrated on the application 112, and the corresponding test strings 210 are illustrated on the command prompt 260 shown in screenshot 200. See the corresponding description of FIG. 2 for a further description of screenshot 200. In brief, the screenshot 200 shows the automated testing process of the accessibility screen-reader 122 for application 112 using system 100.

As illustrated in FIG. 2 and TABLE. 1, the first set of test strings 210a includes a description of the first element 120a, i.e., "my rewards." The first set of test strings 210a includes "my rewards" and "button." As such, when "my rewards" element 120a is selected, the accessibility screen-reader 122 is expected to utter "my rewards" and "button." Likewise, other sets of test strings 210 include descriptions of their corresponding elements 120.

Referring back to FIG. 1, the automation controller 144 is further configured to be operating system or platform-independent such that during the testing process of the accessibility screen-reader 122, the automation controller 144 does not specify the platform installed on the user device 110. For example, the automation controller 144 may generally initiate the testing of a particular application 112 without specifying the platform the user device 110 on which the particular application 112 is being tested.

Speech-to-Text Converter

Speech-to-text converter 146 may be implemented by the processor 142 executing software instructions 152, and is generally configured to convert an audio 158 to a text 230. In one embodiment, the speech-to-text converter 146 may be implemented by a machine learning algorithm 154 that is trained, tested, and refined to convert the audio 158 to text 230. In one embodiment, the speech-to-text converter 146 may be implemented by using any combinations of a plurality of neural network (NN) layers, convolutional NN (CNN) layers, and/or the like.

The speech-to-text converter 146 receives the audio 158 of a string of utterances 220 that is produced or uttered by the accessibility screen-reader 122, and converts the audio 158 to text 230 of the string of utterances 220. In this process, the speech-to-text converter 146 may use any audio processing algorithm, such as analog signal processing, digital signal processing, among others. In one embodiment, the speech-to-text converter 146 may use an Analog to Digital Converter (ADC) module to convert the received analog audio 158 into a digital form for processing.

In processing the audio 158, the speech-to-text converter 146 may extract features or characteristics of the audio 158. The speech-to-text converter 146 then compares the features extracted from the audio 158 with previously extracted features of utterances 220 in a training dataset, where each of the utterances 220 in the training dataset is labeled with its corresponding transcription. In other words, the training dataset comprises a dictionary of utterances 220 labeled with their corresponding transcriptions, where the utterances 220 may include one or more words. The speech-to-text converter 146 then chooses a particular set of utterances 220 (from the training dataset) whose features match (or correspond to) the features of the audio 158. As such, the speech-to-text converter 146 can determine a transcription of the audio 158, i.e., the text 230.

In one embodiment, the speech-to-text converter 146 may use any speech recognition algorithm. For example, the speech-to-text converter 146 may use a specific language model to tune its recognition capability such that it can recognize the string of utterances in the audio 158. By doing so, the accuracy of the speech-to-text converter 146 in determining the correct string of utterances 220 from the audio 158 may be increased.

The accessibility screen-reader 122 produces a particular audio 158 of a string of utterances 220 when a particular action is being performed on the application 112, such as a particular element 120 is being selected/activated, a particular navigating gesture is being captured, etc. Examples of strings of utterances 220 produced by the accessibility screen-reader 122 are described in FIG. 2.

Referring to FIG. 2, when the first element 120, i.e., "my rewards" is selected, the accessibility screen-reader 122 utters "my rewards" and "button," and thus produces a first audio 158 (see FIG. 1). Referring back to FIG. 1, the first audio 158 is forwarded to the accessibility testing module 140 (via the interface module 160). The speech-to-text converter 146 converts the first audio 158 to a first text 230a comprising a first set of string of utterances 220a. The speech-to-text converter 146 forwards the first text 230a to the automation controller 144. The automation controller 144 compares the first text 230a with the first test string 210a. If it is determined that the first text 230a matches the first test string 210a, the automation controller 144 determines that the accessibility screen-reader 122 uttered the set of string of utterances 220a that was expected to be uttered.

In one embodiment, the automation controller 144 may use any text processing algorithm to determine whether the text 230 matches the corresponding test string 210. For example, the automation controller 144 may use string segmentation, tokenization, and the like. For instance, regarding the first element 120a, the automation controller 144 may perform a first string segmentation on the test string 210a to determine keywords of the test string 210a. Similarly, the automation controller 144 may perform a second string segmentation on the text 230a to determine keywords of the text 230a.

The automation controller 144 compares each keyword from the test string 210a with a corresponding keyword from the text 230a. If the automation controller 144 determines that each keyword from the test string 210a matches with its corresponding keyword from the text 230a, it concludes that the text 230a matches the test string 210a. Then, the automation controller 144 proceeds to perform the same process for the next elements 120, as illustrated in FIG. 2.

Driver Module

Driver module 148 may be implemented by the processor 142 executing software instructions 152, and is configured to communicate input commands 156 to the interface module 160 to be forwarded to the user device 110. In one embodiment, the driver module 148 acts as an abstraction layer where input commands 156 are defined. For example, the driver module 148 may include code or script where the input commands 156 are defined.

The input commands 156 are generally defined to emulate actions of a user interacting with the application 112. As an example, a first set of input commands 156a may be defined to emulate selecting or activating the first element 120a, i.e., button 114. In this example, the first set of input commands 156a may include a first input command 156 that emulates pressing/clicking on the button 114 and a second input command 156 that emulates letting up/releasing the button 114.

As another example, a second set of input commands 156b may be defined to emulate selecting or activating the second element 120b, i.e., item 116. Similar to the first example above, the second set of input commands 156b may include a first input command 156 that emulates pressing/clicking on the item 116 and a second input command 156 that emulates letting up/releasing the item 116.

As another example, a third set of input commands 156c may be defined to emulate activating the third element 120c, such as writing a text in text field 118. As another example, other sets of input commands 156 may be defined to emulate performing navigating gestures, such as scrolling up, scrolling down, sliding left, sliding right, and the like.

As such, the input commands 156 are used to navigate and drive the application 112 in order to test every scenario of emulating every action that a user would perform on the application 112. In a particular example, the input commands 156 may include Human Input Device (HID) packets that are configured for communicating via Bluetooth protocols.

As described above, the automation controller 144 is programmed to be user device platform-independent. In some cases, the input commands 156 for emulating the same action may be different on various platforms (and different versions thereof) on the user device 110. As such, the driver module 148 is further configured to determine a platform that is installed on the user device 110, and fetch a particular set of input commands 156 that emulates actions that will be registered, recognized, or operable by the platform installed on the user device 110. For example, once the accessibility testing module 140 is communicatively coupled to the user device 110, it may fetch particular information from the user device 110 indicating the platform installed on the user device 110 prior to initiating the testing process. In another example, the platform of the user device 110 may be provided to the accessibility testing module 140 as a part of the software instructions 152.

In one embodiment, the driver module 148 may also be configured to initialize and establish a connection with the interface module 160. For example, the driver module 148 may set a baud rate that corresponds to the speed of communicating the input commands 156 to the interface module 160. In another example, the driver module 148 may reboot the interface module 160 if the interface module 160 is not operating as expected, such as not transmitting audio 158 to the accessibility testing module 140, etc.

Interface Module

Interface module 160 may generally include any computing device that is configured to process data. The interface module 160 may include a PCB that included components described herein. The interface module 160 includes a processor 162 that is in signal communication with a memory 170. The interface module 160 may be configured as shown or any other configuration.

Processor 162 comprises one or more processors operably coupled to memory 170. The processor 162 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 172) to implement functions of the interface module 160. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more steps of method 300 as described in FIG. 3.

Memory 170 may be volatile or non-volatile and may comprise a read-only memory (ROM), random-access memory (RAM), ternary content-addressable memory (TCAM), dynamic random-access memory (DRAM), and static random-access memory (SRAM). Memory 170 may be implemented using one or more disks, tape drives, solid-state drives, and/or the like. Memory 170 is operable to store the software instructions 172, and/or any other data or instructions. The software instructions 172 may comprise any suitable set of instructions, logic, rules, or code operable to execute the processor 162. For example, the software instructions 172 may include configuration files to configure the interface module 160 to 1) accept or receive input commands 156 from the accessibility testing module 140, 2) communicate the input commands 156 to the user device 110, 3) capture audio 158 from the user device 110, and 4) communicate the audio 158 to the accessibility testing module 140.

The interface module 160 may include one or more connection ports to communicate data between the accessibility testing module 140 and the user device 110. In the illustrated embodiment, the interface module 160 includes connection drivers 164, 166, and an audio driver 168. In other embodiments, the interface module 160 may include any number of connection ports.

The interface module 160 is generally configured to act as an interface between the accessibility testing module 140 and the user device 110. The interface module 160 is configured to receive the input commands 156 from the accessibility testing module 140, and transfer the input commands 156 to the user device 110. The interface module 160 may receive the input commands 156 from the accessibility testing module 140 at the connection driver 164. The interface module 160 may transfer the input commands 156 to the user device 110 by the connection driver 166.

The interface module 160 is also configured to capture audio 158 uttered by the accessibility screen-reader 122, and transfer the audio 158 to the accessibility testing module 140. The interface module 160 may capture the audio 158 uttered by the accessibility screen-reader 122 at the connection driver 166. The interface module 160 may transfer the audio 158 to the accessibility screen-reader 122 via the audio driver 168.

The interface module 160 is communicatively coupled with the accessibility testing module 140 and the user device 110 using any suitable medium. In one embodiment, the interface module 160 may receive the input commands 156 from the accessibility testing module 140 via a wired communication (e.g., serial, parallel, and the like). In one embodiment, the interface module 160 may transfer the input commands 156 to the user device 110 via a wireless communication (e.g., Bluetooth, WiFi, and the like). In one embodiment, the interface module 160 may capture the audio 158 uttered by the accessibility screen-reader 122 via a wireless communication (e.g., Bluetooth, WiFi, and the like). In one embodiment, the interface module 160 may transfer the audio 158 to the accessibility screen-reader 122 via a wired communication (e.g., serial, parallel, and the like). Although certain embodiments described above include certain communicating mediums, it should be understood that the interface module 160 may communicate the input commands 156 and the audio 158 between the accessibility testing module 140 and the user device 110 using mediums other than those described above.

As such, the interface module 160 is configured to act as both 1) an input interface (e.g., a keyboard, a touchscreen, a mouse, etc.) to the user device 110 to emulate actions of a user and drive or navigate the application 112, and 2) a listening or audio capturing interface (e.g., a headset, an audio recorder, etc.) to capture audio 158 spoken by the accessibility screen-reader 122 and forward the audio 158 to the accessibility testing module 140.

In some embodiments, the accessibility testing module 140 and the interface module 160 may be implemented using any number of PCBs. For example, in some embodiments, the accessibility testing module 140 and the interface module 160 may be implemented in one PCB. In other words, the accessibility testing module 140 and the interface module 160 may be implemented in one module that performs the functions of the accessibility testing module 140 and the interface module 160.

In some embodiments, the system 100 may further be configured to conduct automated testing of the accessibility screen-reader 122 for a website. As such, the input commands 156 may emulate any action of a user navigating through webpages of the website.

In some embodiments, the system 100 may further be configured to conduct automated testing of the accessibility screen-reader 122 for the user device 110 without a particular application 112 being on the screen of the user device 110. For example, the system 100 may conduct automated testing of the accessibility screen-reader 122 for icons, folders, menus, search fields, text fields, among other items on the screen of the user device 110. As such, the input commands 156 may emulate any action of a user navigating through the user device 110.

In some embodiments, when an element 120 on the software application 112 is activated, the accessibility screen-reader 122 may output braille text instead of or in addition to audio 158. As such, the system 100 may be configured to convert the outputted braille text to text 230, and compare it with a corresponding test string 210.

Example Screenshot of Testing Process of the Accessibility Screen-Reader

FIG. 2 illustrates an example screenshot 200 of the automated testing process of the accessibility screen-reader 122 using the system 100 of FIG. 1. As illustrated in FIG. 2, an exemplary application 112 on the user device 110 is on the left side; and a command prompt environment 260 to run the test and interact with the accessibility testing module 140 is on the right side of the screenshot 200.

As can be seen in the command prompt 260, the automation controller 144 has been invoked by an input test file comprising the sets of test strings 210a to 210i. Typically, the testing process may begin with a test string 210 comprising "Voiceover on" (not shown due to lack of space), which causes the voiceover feature of the accessibility screen-reader 122 to turn on, and end with a test string 210i comprising "Voiceover off," which causes the voiceover feature of the accessibility screen-reader 122 to turn off.

On the command prompt 260, the automation controller 144 is executing test cases 240a to 240i for elements 120 shown on the foreground of the application 112. The processes of executing test cases 240a to 240i are described in detail in FIG. 1. For example, during the test case 240a, the automation controller 144 compares the test string 210a with text 230 which is converted from audio 158 uttered by the accessibility screen-reader 122 when the element 120a is selected. If the test string 210a matches the text 230, the automation controller 144 displays "PASS" on the command prompt 260. The automation controller 144 performs the same process for other test cases 240 as illustrated in the command prompt 260.

Regarding the last test case 240i, corresponding input commands 156 may comprise opening a particular folder/icon associated with settings of the accessibility screen-reader 122 and turning off the voiceover feature.

At the end of the testing process, the automation controller 144 determines the result 250 illustrated at the bottom of the command prompt 260. As can be seen in FIG. 2, the result 250 indicates that all the test cases 240 have passed, indicating that the accessibility screen-reader 122 has uttered every test string 210 as it was expected for each test case 240.

Figure 3:
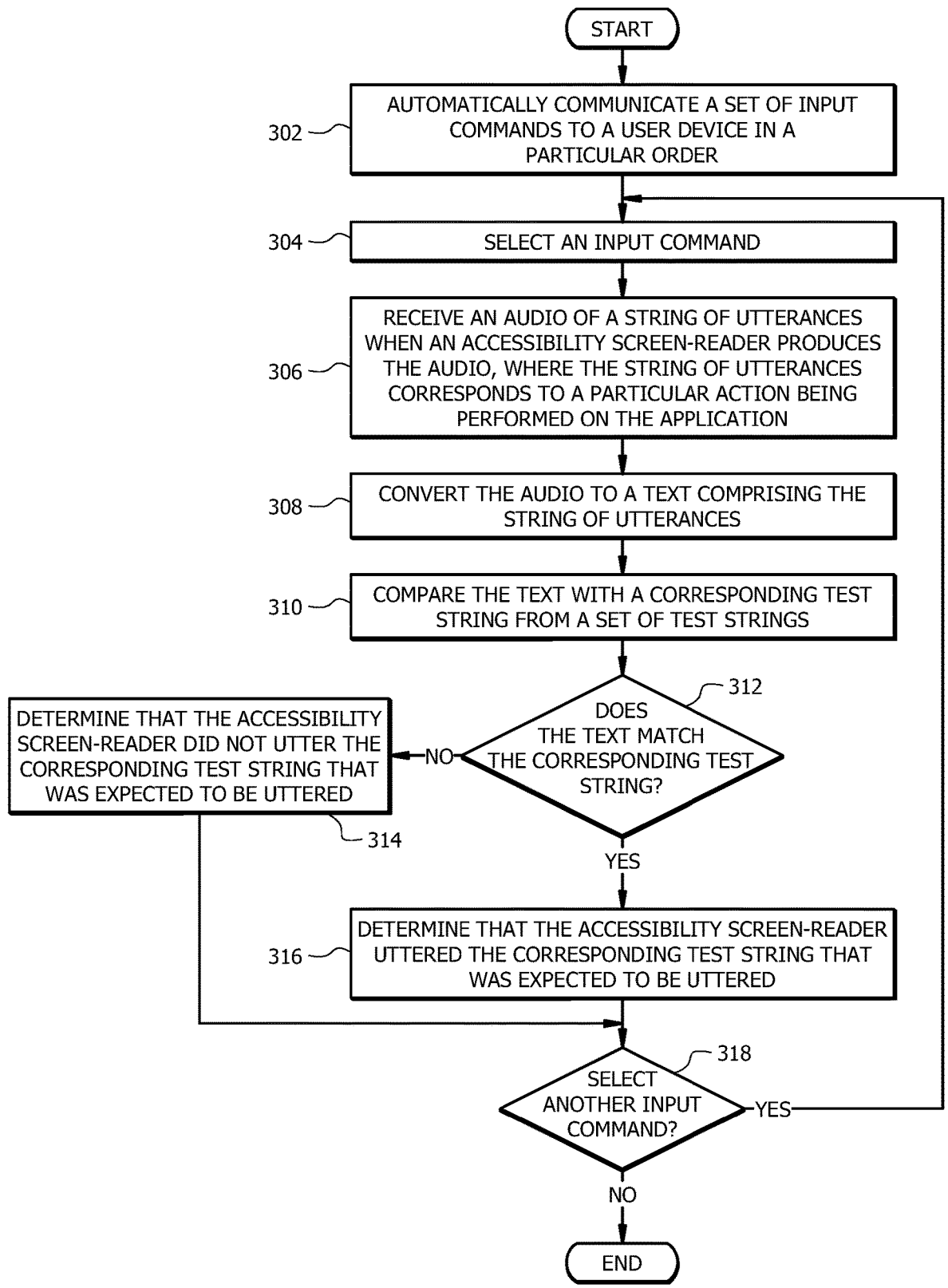
FIG. 3 illustrates an example flowchart of a method for automating testing of an accessibility screen-reader for an application.

Example Method for Automating Testing of an Accessibility Screen-Reader for an Application FIG. 3 illustrates an example flowchart of a method 300 for automating testing of an accessibility screen-reader 122 for an application 112.

Modifications, additions, or omissions may be made to method 300. Method 300 may include more, fewer, or other steps. For example, steps may be performed in parallel or in any suitable order. While at times discussed as the system 100, accessibility testing module 140, interface module 160, or components of any of thereof performing steps, any suitable system or components of the system may perform one or more steps of the method 300. For example, on or more steps of the method 300 may be implemented, at least in part, in the form of software instructions 152 and 172 of FIG. 1, stored on non-transitory, tangible, machine-readable media (e.g., memories 150 and 170 of FIG. 1) that when run by one or more processors (e.g., processors 142 and 162 of FIG. 1) may cause the one or more processors to perform steps 302-318.

Method 300 begins at step 302 when the accessibility testing module 140 automatically communicates a set of input commands 156 to a user device 110 in a particular order.

In this process, the automation controller 144 forwards each set of test strings 210 to the driver module 148 to fetch its corresponding input command(s) 156 and communicate those to the user device 110, similar to that described in FIG. 1. The automation controller 144 forwards the set of test strings 210 to the driver module 148 in a particular order, for example, in an order that stored in an input test file.

In one embodiment, the accessibility testing module 140 communicates the set of input commands 156 to the user device 110 via the interface module 160. In some examples, the accessibility testing module 140 may communicate the set of input commands 156 by any suitable medium including but not limited to a wired communication and/or wireless communications, similar to that described in FIG. 1.

The set of input commands 156 are defined to emulate a set of actions being performed on the application 112, such as selecting/activating buttons 114 and items 116, filling out text fields 118, and performing navigating gestures, similar to that described in FIGS. 1 and 2. The set of input commands 156 may correspond to the set of test strings 210 that is expected to be uttered by the accessibility screen-reader 122 when a corresponding set of actions is performed on the application 112.

At step 304, the automation controller 144 selects an input command 156 from the set of input commands 156. For example, the automation controller 144 selects the first set of test strings 210a to be forwarded to the driver module 148 to fetch the input commands 156 that emulate the first particular action related to the first element 120a being performed on the application 112. The automation controller 144 iteratively selects an input command 156 until the end of the input test file, i.e., till the last set of test strings 210.

At step 306, the accessibility testing module 140 receives an audio 158 of a string of utterances 220 when the accessibility screen-reader 122 produces (or utters) the audio 158. In one embodiment, the accessibility testing module 140 may receive the audio 158 from the interface module 160. In one embodiment, the accessibility testing module 140 may receive the audio 158 by any suitable medium, such as wired and/or wireless communications, similar to that described in FIG. 1. The audio 158 is then routed to the speech-to-text converter 146 for processing.

At step 308, the speech-to-text converter 146 convents the audio 158 to a text 230 comprising the string of utterances 220. In this process, the speech-to-text converter 146 may use machine learning algorithms 154, similar to that described in FIG. 1. The speech-to-text converter 146 may be configured to tune its recognition capabilities to increase the accuracy in recognizing the string of utterances 220 in the audio 158. The speech-to-text converter 146 then forwards the generated text 230 to the automation controller 144.

At step 310, the automation controller 144 compares the text 230 with a corresponding test string 210 from the set of test strings 210. In this process, the automation controller 144 may use any text processing algorithm, such as NLP, semantic analysis, etc., similar to that described in FIG. 1. For example, the automation controller 144 may use string segmentation to separate keywords in text 230, and in the corresponding test string 210. The automation controller 144 then compares each keyword from text 230 with a corresponding keyword from the corresponding test string 210.

At step 312, the automation controller 144 determines whether the text 230 matches the corresponding test string 210. In this process, the automation controller 144 determines whether each keyword from the text 230 matches its corresponding keyword from the corresponding test string 210, e.g., using NLP, semantic analysis, etc. If it is determined that the text 230 does not match the corresponding test string 210, the method 300 proceeds to step 314. If, however, it is determined that the text 230 matches the corresponding test string 210, the method 300 proceeds to step 316.

At step 314, the automation controller 144 determines that the accessibility screen-reader 122 did not utter the corresponding test string 210 that was expected to be uttered. In other words, the automation controller 144 determines that the particular action being performed on the element 120 (emulated by the input commands 156) may not be labeled or attributed with a correct set of string of utterances 220.

At step 316, the automation controller 144 determines that the accessibility screen-reader 122 uttered the corresponding test string 210 that was expected to be uttered. In other words, the automation controller 144 determines that the particular action being performed on the element 120 (emulated by the input commands 156) is labeled or attributed with a correct set of string of utterances 220.

At step 318, the automation controller 144 determines whether to select another input command 156. Here, the automation controller 144 determines whether all the test strings 210 are forwarded to the driver module 148 to fetch their corresponding input commands 156 to forward to the user device 110. If at least one test string 210 is left in the testing process, the automation controller 144 forwards that test string 210 to the driver module 148 to fetch its corresponding input command 156 and forwards it to the user device 110, e.g., via the interface module 160.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application 112 in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for automating testing of an accessibility screen-reader for a software application the system, comprising:
    an accessibility testing module, communicatively coupled with a user device the accessibility testing module, comprising:
        a memory operable to store:
            a set of test strings that is expected to be uttered by an accessibility screen-reader when a corresponding set of actions is performed on a software application on the user device, wherein the set of actions comprises at least one of selecting an item, filling out a text field, and a performing navigating gesture on the software application; and
            a set of input commands, wherein:
                the set of input commands emulates the set of actions on the software application; and
                the set of input commands corresponds to the set of test strings;
        a first processor, operably coupled with the memory, configured to:
            automatically communicate the set of input commands to the user device in a particular order;
            for each input command from the set of input commands:
                receive an audio of a string of utterances when the accessibility screen-reader produces the audio, wherein the string of utterances corresponds to a particular action being performed on the software application;
                convert the audio to a text comprising the string of utterances;

compare the text with a corresponding test string from the set of test strings;

determine whether the text matches the corresponding test string; and in response to determining that the text matches the corresponding test string, determine that the accessibility screen-reader uttered the corresponding test string that was expected to be uttered.

2. The system of claim 1, further comprising an interface module, communicatively coupled with the user device and the accessibility testing module, comprising a second processor configured to:

receive the set of input commands from the accessibility testing module via a wired communication; and transfer the set of input commands to the user device via a wireless communication.

3. The system of claim 2, wherein the second processor is further configured to:

receive the audio from the user device via a wireless communication; and transfer the audio to the accessibility testing module via a wired communication.

4. The system of claim 1, wherein converting the audio to the text comprising the string of utterances comprises tuning a recognition capability of the first processor such that the first processor is tuned to recognize the string uttered in the audio.

5. The system of claim 1, wherein comparing the text with the corresponding test string from the set of test strings comprises:

performing a first string segmentation on the test string to determine a first set of keywords of the test string;

performing a second string segmentation on the text to determine a second set of keywords of the text; and comparing each keyword from the first set of keywords with a corresponding keyword from the second set of keywords.

6. The system of claim 5, wherein determining that the accessibility screen-reader uttered the corresponding test string that was expected to be uttered comprises:

determining whether each of the first set of keywords matches each of the second set of keywords; and in response to determining that each of the first set of keywords matches each of the second set of keywords, determining that the accessibility screen-reader uttered the corresponding test string that was expected to be uttered.

7. The system of claim 1, wherein performing the navigating gesture on the software application comprises at least one of sliding right, sliding left, scrolling up, and scrolling down.

8. A method for automating testing of an accessibility screen-reader for a software application, comprising:

automatically communicating a set of input commands to a user device in a particular order, wherein:

the set of input commands emulates a set of actions on a software application installed on the user device; and the set of input commands corresponds to a set of test strings;

the set of test strings is expected to be uttered by an accessibility screen-reader when a corresponding set of actions is performed on the software application;

the set of actions comprises at least one of selecting an item, filling out a text field, and performing a navigating gesture on the software application;

for each input command from the set of input commands:

receiving an audio of a string of utterances when the accessibility screen-reader produces the audio, wherein the string of utterances corresponds to a particular action being performed on the software application;

converting the audio to a text comprising the string of utterances;

comparing the text with a corresponding test string from the set of test strings;

determining whether the text matches the corresponding test string; and in response to determining that the text matches the corresponding test string, determining that the accessibility screen-reader uttered the corresponding test string that was expected to be uttered.

9. The method of claim 8, further comprising:

receiving the set of input commands from an accessibility testing module via a wired communication; and transferring the set of input commands to the user device via a wireless communication.

10. The method of claim 9, further comprising:

receiving the audio from the user device via a wireless communication; and transferring the audio to the accessibility testing module via a wired communication.

11. The method of claim 8, wherein converting the audio to the text comprising the string of utterances comprises tuning a recognition capability of a first processor such that the first processor is tuned to recognize the string uttered in the audio.

12. The method of claim 8, wherein comparing the text with the corresponding test string from the set of test strings comprises:

performing a first string segmentation on the test string to determine a first set of keywords of the test string;

performing a second string segmentation on the text to determine a second set of keywords of the text; and comparing each keyword from the first set of keywords with a corresponding keyword from the second set of keywords.

13. The method of claim 12, wherein determining that the accessibility screen-reader uttered the corresponding test string that was expected to be uttered comprises:

determining whether each of the first set of keywords matches each of the second set of keywords; and in response to determining that each of the first set of keywords matches each of the second set of keywords, determining that the accessibility screen-reader uttered the corresponding test string that was expected to be uttered.

14. The method of claim 8, wherein performing the navigating gesture on the software application comprises at least one of sliding right, sliding left, scrolling up, and scrolling down.

15. A computer program comprising executable instructions stored in a non-transitory computer-readable medium that when executed by a processor causes the processor to:

automatically communicate a set of input commands to a user device in a particular order, wherein:

the set of input commands emulates a set of actions on a software application installed on the user device; and the set of input commands corresponds to a set of test strings;

the set of test strings is expected to be uttered by an accessibility screen-reader when a corresponding set of actions is performed on the software application;

the set of actions comprises at least one of selecting an item, filling out a text field, and performing a navigating gesture on the software application;

for each input command from the set of input commands:
receive an audio of a string of utterances when the accessibility screen-reader produces the audio, wherein the string of utterances corresponds to a particular action being performed on the software application;

convert the audio to a text comprising the string of utterances;

compare the text with a corresponding test string from the set of test strings;

determine whether the text matches the corresponding test string; and in response to determining that the text matches the corresponding test string, determine that the accessibility screen-reader uttered the corresponding test string that was expected to be uttered.

16. The computer program of claim 15, wherein the processor is further configured to:
receive the set of input commands from an accessibility testing module via a wired communication; and
transfer the set of input commands to the user device via a wireless communication.

17. The computer program of claim 16, wherein the processor is further configured to:
receiving the audio from the user device via a wireless communication; and
transferring the audio to the accessibility testing module via a wired communication.

18. The computer program of claim 15, wherein converting the audio to the text comprising the string of utterances comprises tuning a recognition capability of a first processor such that the first processor is tuned to recognize the string uttered in the audio.

19. The computer program of claim 15, wherein comparing the text with the corresponding test string from the set of test strings comprises:
performing a first string segmentation on the test string to determine a first set of keywords of the test string;
performing a second string segmentation on the text to determine a second set of keywords of the text; and
comparing each keyword from the first set of keywords with a corresponding keyword from the second set of keywords.

20. The computer program of claim 19, that the accessibility screen-reader uttered the corresponding test string that was expected to be uttered comprises:
determine whether each of the first set of keywords matches each of the second set of keywords; and
in response to determining that each of the first set of keywords matches each of the second set of keywords, determine that the accessibility screen-reader uttered the corresponding test string that was expected to be uttered.

* * * * *